US012149909B2

(12) United States Patent
Yang et al.

(10) Patent No.: US 12,149,909 B2
(45) Date of Patent: Nov. 19, 2024

(54) DAMPER AND SOUND-PRODUCING DEVICE

(71) Applicant: Goertek Inc., Shandong (CN)

(72) Inventors: Jianbin Yang, Weifang (CN); Shousong Qiang, Weifang (CN); Chunfa Liu, Weifang (CN)

(73) Assignee: Goertek Inc., Shandong (CN)

( * ) Notice: Subject to any disclaimer, the term of this patent is extended or adjusted under 35 U.S.C. 154(b) by 0 days.

(21) Appl. No.: 17/773,352

(22) PCT Filed: Nov. 5, 2020

(86) PCT No.: PCT/CN2020/126818

§ 371 (c)(1),
(2) Date: Apr. 29, 2022

(87) PCT Pub. No.: WO2021/088932

PCT Pub. Date: May 14, 2021

(65) Prior Publication Data

US 2024/0155295 A1 May 9, 2024

(30) Foreign Application Priority Data

Nov. 8, 2019 (CN) ......................... 201911089324.6

(51) Int. Cl.
*H04R 9/06* (2006.01)
*H04R 7/04* (2006.01)
(Continued)

(52) U.S. Cl.
CPC ............... *H04R 9/043* (2013.01); *H04R 7/04* (2013.01); *H04R 7/18* (2013.01); *H04R 9/025* (2013.01);
(Continued)

(58) Field of Classification Search
CPC . H04R 7/04; H04R 7/18; H04R 9/025; H04R 9/043; H04R 9/045; H04R 9/046; H04R 9/06; H04R 2499/11
See application file for complete search history.

(56) References Cited

U.S. PATENT DOCUMENTS 10,237,661 B2 * 3/2019 Cai ......................... H04R 23/02
2017/0339478 A1 * 11/2017 Xiao ....................... H04R 9/025
2022/0394390 A1 * 12/2022 Yang ........................ H04R 9/06

FOREIGN PATENT DOCUMENTS

CN 208112932 U * 11/2018
CN 110418258 A 11/2019
WO WO-2019205711 A1 * 10/2019 ............... H04R 9/04

* cited by examiner

*Primary Examiner* — Huyen D Le
(74) *Attorney, Agent, or Firm* — Baker Botts LLP

(57) ABSTRACT

Disclosed are a damper and a sound-producing device. The damper includes a first connecting part, a planar elastic part and a second connecting part. One side of the first connecting part is configured to cooperatively connect to a voice coil of the sound-producing device; an end of the first connecting part is bent and extends in an S shape toward the other side of the first connecting part to form the planar elastic part, the planar elastic part and the first connecting part being in the same plane; the second connecting part is connected to one end of the planar elastic part away from the first connecting part, and the second connecting part is configured to be fixedly connected in the sound-producing device; and the damper is a line-like structure formed by integral winding.

10 Claims, 7 Drawing Sheets

(51) Int. Cl.
*H04R 7/18* (2006.01)
*H04R 9/02* (2006.01)
*H04R 9/04* (2006.01)

(52) U.S. Cl.
CPC ............. *H04R 9/045* (2013.01); *H04R 9/046* (2013.01); *H04R 9/06* (2013.01); *H04R 2499/11* (2013.01)

b: Acute Angle α=15°; c: Acute Angle α=25°; d: Acute Angle α=35° b: A Sound-producing Device Installed with a Prior Art Damper: Resonant Frequency F0 =195Hz
c: A Sound-producing Device Installed with the Damper of the Present Disclosure: Resonant Frequency F0=170Hz b: A Sound-producing Device Installed with a Prior Art Damper
c: A Sound-producing Device Installed with the Damper of the Present Disclosure

DAMPER AND SOUND-PRODUCING DEVICE

CROSS-REFERENCE TO RELATED APPLICATIONS

This application is a National Stage of International Application No. PCT/CN2020/126818, filed on Nov. 5, 2020, which claims priority to Chinese Patent Application No. 201911089324.6, filed on Nov. 8, 2019, both of which are hereby incorporated by reference in their entireties.

TECHNICAL FIELD

The present disclosure relates to the technical field of electro-acoustic conversion, and more particularly to a damper and a sound-producing device.

BACKGROUND

With the rapid development of science and technology, audio equipment is becoming more and more popular. Demands on audio equipment are not only limited to audio playback, but also increasingly put forward on reliability of audio equipment. In audio equipment, a sound-producing device is a commonly used electronic component which is mainly used for the playback of audio signals, and its reliability directly influences the function of the audio equipment with a sound-producing device.

A damper is one of the basic components of a sound-producing device, and functions mainly to ensure the correct position of the voice coil in the magnetic gap so that the vibration system reciprocates only in the axial direction when the voice coil is under force, and to provide elastic force for reciprocating motion of the vibration system. A damper in the prior art exhibits a corrugated shape which undulates in the axial direction thereof, and is usually made of fibrous materials. Damper of such structures and materials suffer from large space occupation in the height direction of the sound-emitting device. In addition, due to material restrictions, it is difficult to make the Kms (mechanical stiffness) of the damper very small; as such, when the sound-producing device is under large vibration displacement, the compliance provided by the damper becomes poor, and it is difficult to reduce the F0 of the speaker unit. What is more, existing dampers are prone to deformation and hardness variation in a high temperature and high humidity environment, and are of poor resistance against fatigue.

In view of this, it is necessary to provide a new technical solution to solve the above technical problems.

SUMMARY

An object of the present disclosure is to provide a new technical solution for a damper and a sound-producing device.

According to one aspect of the present disclosure, there is provided a damper which includes:

- a first connecting part, one side of which is configured to cooperatively connect to a voice coil of the sound-producing device;
- a planar elastic part, which is formed by an end of the first connecting part being bent and extending in an S shape toward the other side of the first connecting part, the planar elastic part and the first connecting part being in the same plane; and

- a second connecting part, which is connected to one end of the planar elastic part away from the first connecting part, and is configured to be fixedly connected in the sound-producing device;
- wherein the damper is a line-like structure formed by integral winding.

Optionally, the first connecting part, the planar elastic part and the second connecting part are all made of metal material.

Optionally, the metal material is any one of phosphor bronze, iron, steel or alloy material.

Optionally, there is provided one planar elastic part which is formed by one end of the first connecting part being bent and extending in an S shape.

Optionally, there are provided two planar elastic parts which are formed by both ends of the first connecting part being bent and extending in an S shape respectively.

Optionally, the first connecting part is in the shape of an arc between the two planar elastic parts.

Optionally, the first connecting part is in the shape of a broken line between the two planar elastic parts.

Optionally, one end of the planar elastic part away from the first connecting part is bent into a hook structure to form the second connecting part.

Optionally, the second connecting part includes one loop of hook structures; or the second connecting part includes at least two loops of hook structures having overlapped orthographic projections in the vertical direction.

Optionally, a width of the planar elastic part gradually increases along a direction from the first connecting part to the second connecting part, with extension lines of two sides of the planar elastic part in its width direction intersecting at a point in a direction in which the first connecting part faces away from the second connecting part and forming an acute angle.

Optionally, the acute angle is no less than 10°.

According another aspect of the present disclosure, there is provided a sounding-producing device, which includes:

- a vibration system, including a combination of a diaphragm, a voice coil, a voice coil bobbin and the damper as described above;
- a magnetic circuit system having a magnetic gap in which the voice coil is suspended; and
- a casing, configured to house the vibration system and the magnetic circuit system;
- wherein the voice coil is wound on the voice coil bobbin, the diaphragm is connected to one end of the voice coil bobbin, the first connecting part of the damper is connected to an outer side wall of the voice coil bobbin or to a root region of the voice coil, and the second connecting part of the damper is fastened to the casing.

One technical effect of the present disclosure is that, by providing a damper of a planar structure and made of metal material, during its application, the internal and external conduction of the circuit can be realized simultaneously. As such, the lead wires of the prior art may be omitted, saving a lot of space in the vertical direction for the sound-producing device, and facilitating manufacturing of a compact sound-producing device. Further, the damper of the present disclosure can be made of metal material. Compared with prior art materials such as fiber, the damper of the present disclosure may have a smaller Kms, such that it can provide better compliance under large displacement vibration and reduce the F0 of the sound-producing device. Moreover, the damper of the present disclosure is less prone to the influences of a high-temperature, high humidity environment, and has excellent resistance against fatigue.

Other features and advantages of the present disclosure will be readily apparent from the following detailed description of exemplary embodiments of the present disclosure with reference to the drawings.

BRIEF DESCRIPTION OF THE DRAWINGS

The accompanying drawings, which are incorporated into this specification and constitute a part thereof, illustrate embodiments of the present disclosure and, together with the description, serve to explain the principles of the present disclosure.

DETAILED DESCRIPTION

Figure 1:
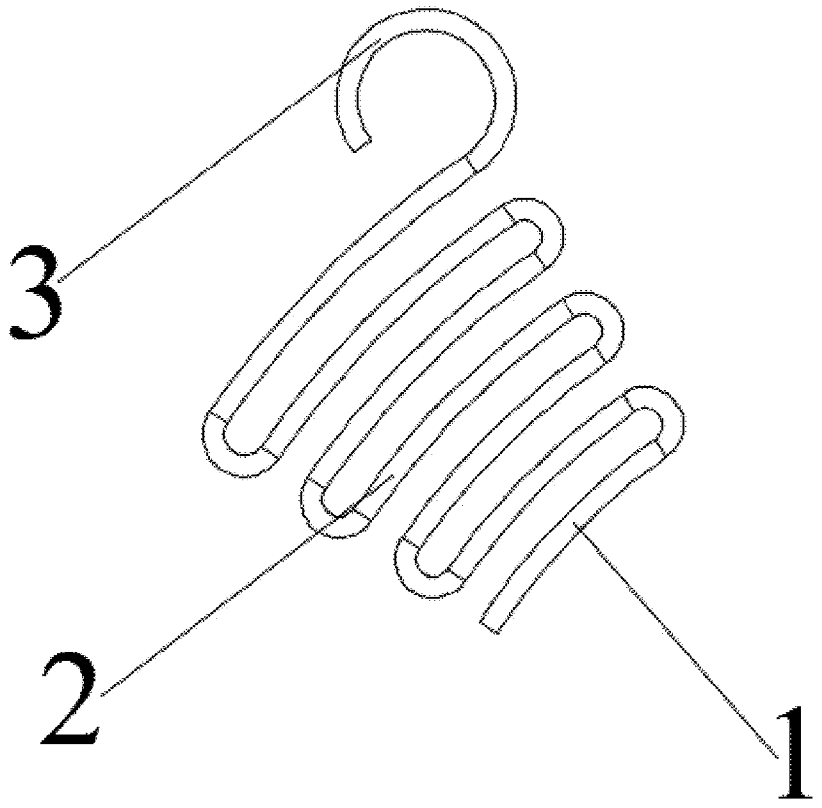
FIG. 1 is a Schematic Illustration 1 of the front view structure of a damper of the present disclosure.

Various exemplary embodiments of the present disclosure will now be described in detail with reference to the accompanying drawings. It is to be noted that unless otherwise specified, relative arrangement, numerical expressions and numerical values of components and steps illustrated in these embodiments do not limit the scope of the present disclosure.

Description to at least one exemplary embodiment is in fact illustrative only, and is in no way limiting to the present disclosure or application or use thereof.

Techniques, methods and devices known to those skilled in the prior art may not be discussed in detail; however, the techniques, methods and devices shall be regarded as part of the description where appropriate.

In all the illustrated and discussed examples, any specific value shall be explained as only exemplary rather than restrictive. Thus, other examples of exemplary embodiments may have different values.

It is to be noted that similar reference numbers and alphabetical letters represent similar items in the drawings below, such that once a certain item is defined in a drawing, further discussion thereon in the subsequent drawings is no longer necessary.

Referring to FIGS. 1 to 5, an embodiment of the present disclosure provides a damper which includes a first connecting part 1, a planar elastic part 2 and a second connecting part 3. One side of the first connecting part 1 is configured to cooperatively connect to a voice coil of the sound-producing device; an end of the first connecting part 1 is bent and extends in an S shape toward the other side of the first connecting part to form the planar elastic part 2, the planar elastic part 2 and the first connecting part 1 being in the same plane; the second connecting part 3 is connected to one end of the planar elastic part 2 away from the first connecting part 1, and the second connecting part 3 is configured to be fixedly connected in the sound-producing device; and the damper is a line-like structure formed by integral winding.

A damper in the prior art is a loop-shaped structure as a whole, which is formed into a corrugated shape which undulates in the axial direction thereof. A damper in the prior art is typically installed between the magnetic circuit system and vibration diaphragm of the sound-emitting device, and is usually connected to the outer side wall of the voice coil bobbin. During vibration, the damper needs to occupy a certain space in the axial direction, and therefore it is difficult to manufacture a sound-producing device with a very small height. In an embodiment of the present disclosure a novel damper is designed, where the planar elastic part 2 and the first connecting part 1 are located in the same plane. When the damper of the present disclosure is installed on the sound-producing device, it occupies a relatively small space in the height direction, saving a lot of space for the sound-producing device and facilitating manufacturing of a compact sound-producing device. Further, the damper of the embodiment of the present disclosure is a line-like structure formed by integrally winding, and this molding method is easy to operate in terms of technology and easy to produce and process.

In one embodiment, the first connecting part 1, the planar elastic part 2 and the second connecting part 3 are all made of metal material. In one embodiment, the metal material is any one of phosphor bronze, iron, steel or alloy material.

A damper in the prior art is typically made of fibrous materials, such as CONEX (meta-aramid), blended material and cloth. A damper made in this way has poor compliance under large displacement vibration of the sound-producing device, and tends to deform in a high temperature and high humidity environment; the hardness thereof is likely to variate, leading to a poor fatigue resistance. By contrast, the damper of the present disclosure is made of metal material. On one hand, it can provide better compliance under large displacement vibration, and is less influenced by high temperature and high humidity environment, and has excellent fatigue resistance. On the other hand, since the damper is made of metal material, it can realize electricity conduction, and thus the conduction between the internal and external circuits thereof can be realized by means of the damper structure itself without a separate lead wire, thereby saving the space reserved in the vertical direction for the wiring of the lead wire, facilitating to the manufacturing of a thinner and lighter sound-producing device. Test has proved that it is possible to select any of phosphor bronze, iron wire, steel wire and alloy wire for the metal material of the damper. Of course, these several materials are only available materials verified by the skilled person through limited experiments, and are not intended to limit the present disclosure.

Referring to FIG. 1, in one embodiment, there is provided one planar elastic part 2, which is formed by one end of the first connecting part 1 being bent and extending in an S shape. In this embodiment, the length of the first connecting part 1 is substantially consistent with the minimum width of the planar elastic part 2, and the size of the entire damper is relatively small.

Figure 2:
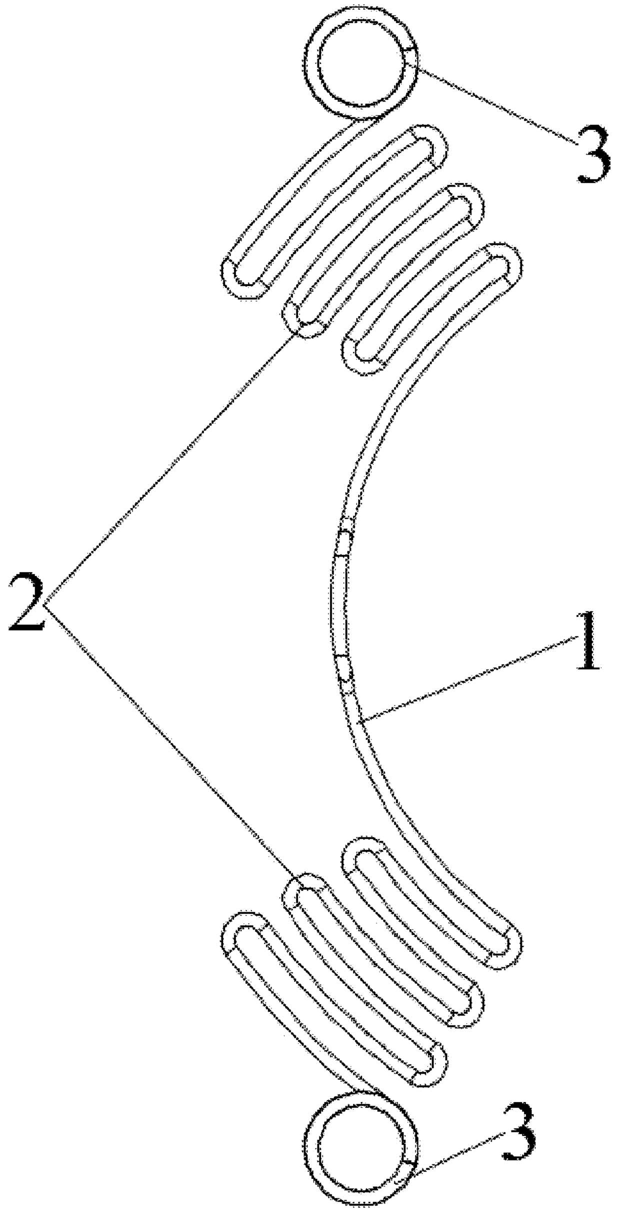
FIG. 2 is a Schematic Illustration 2 of the front view structure of a damper of the present disclosure.
Figure 4:
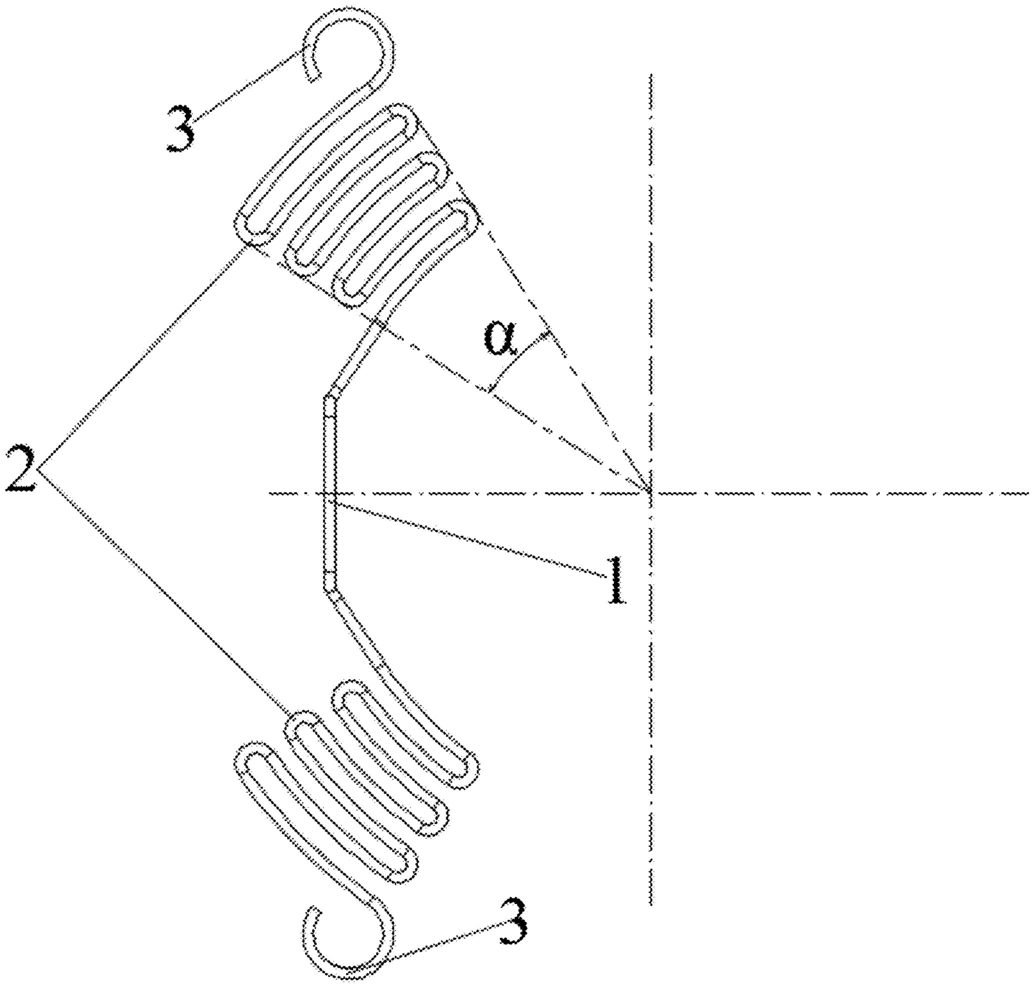
FIG. 4 is a Schematic Illustration 3 of the front view structure of a damper of the present disclosure.

Referring to FIG. 2 and FIG. 4, in another embodiment, there are provided two planar elastic parts 2 which are formed by both ends of the first connecting part 1 being bent and extending in an S shape respectively. In this embodiment, the length of the first connecting part 1 is relatively long, and the two planar elastic parts 2 are symmetrically distributed at two ends of the first connecting part 1.

Figure 3:
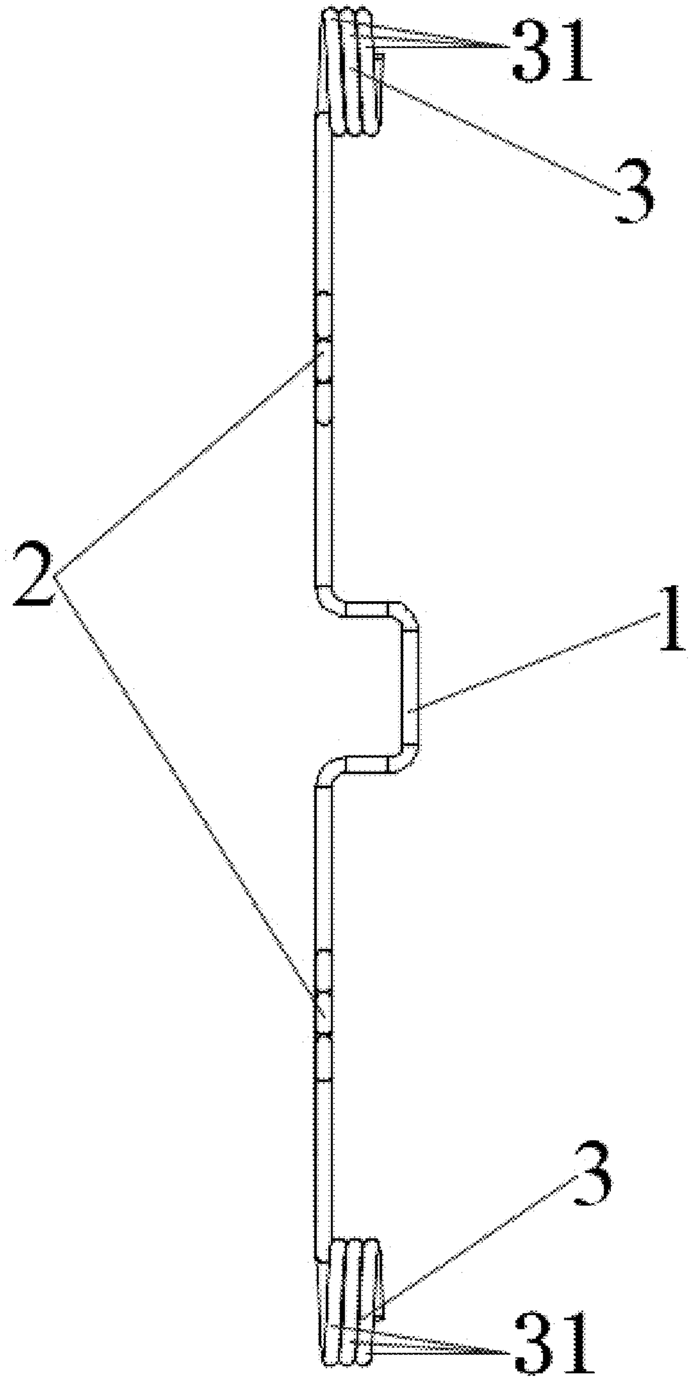
FIG. 3 is a side view of FIG. 2.

In one embodiment, as shown in FIG. 2 and FIG. 3, the first connecting part 1 is in the shape of an arc between the two planar elastic parts 2. In addition, an outwardly convex structure is formed in the middle of the first connecting part 1 to enhance the stability of connection between the damper and the voice coil of the sound-producing device.

Figure 5:
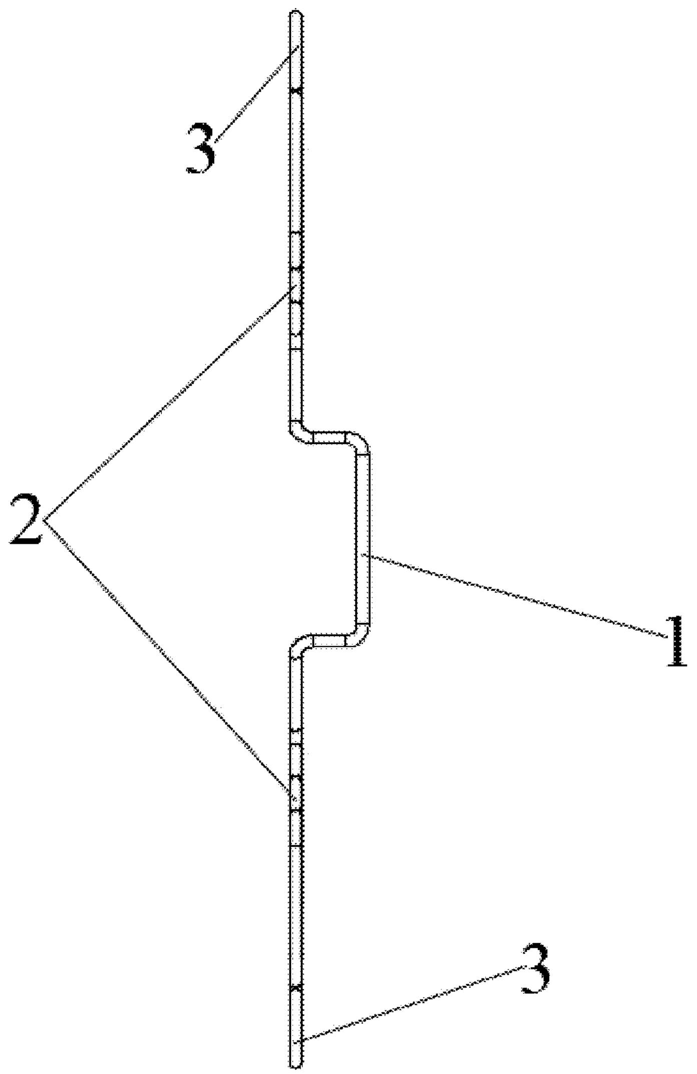
FIG. 5 is the side view of FIG. 4.

In one embodiment, as shown in FIG. 4 and FIG. 5, the first connecting part 1 is in the shape of a broken line between the two planar elastic parts 2. In addition, an outwardly convex structure is formed in the middle of the first connecting part 1 to enhance the stability of the connection between the damper and the voice coil of the sound-producing device.

In one embodiment, one end of the planar elastic part 2 away from the first connecting part 1 is bent into a hook structure to form the second connecting part 3.

In one embodiment, the second connecting part 3 includes one loop of hook structures; or, the second connecting part 3 includes at least two loops 31 of hook structures having overlapped orthographic projections in the vertical direction. When there is provided one loop of hook structure, the second connecting part 3, the first connecting part 1 and the planar elastic part 2 are all located in the same plane as a whole, that is, the damper is a completely planar structure which can ensure the flatness of the product. The second connecting part 3 of the hook structure is for fixing with the sound-producing device; and increasing the number of bending turns of the hooking structure is beneficial to fix the second connecting part 3 and the sound-producing device more stably.

Figure 6:
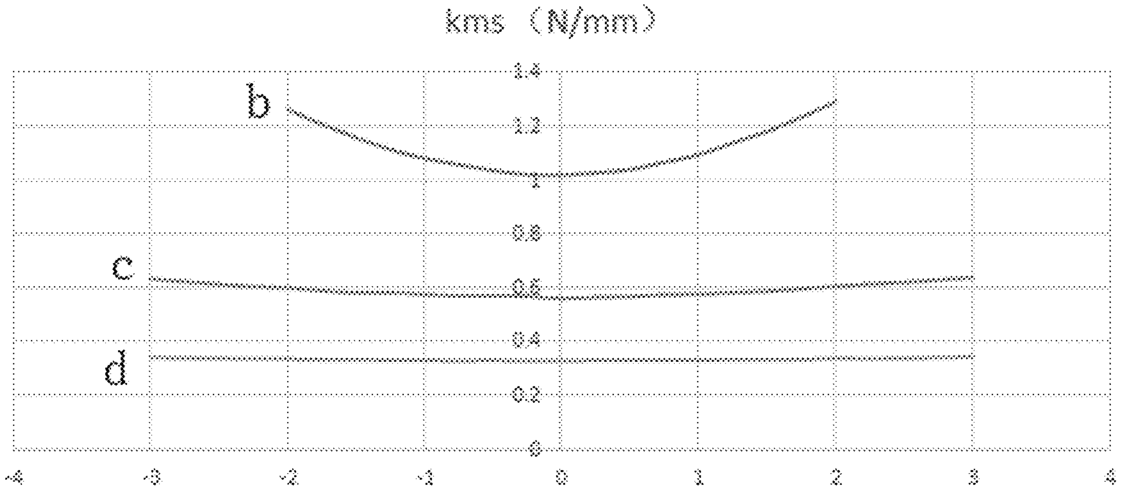
FIG. 6 is a plot of mechanical stiffness Kms values corresponding to different acute angles α.

In one embodiment, as shown in FIG. 4, a width of the planar elastic part 2 gradually increases along a direction from the first connecting part 1 to the second connecting part 3, with extension lines of two sides of the planar elastic part 2 in its width direction intersecting at a point in the direction in which the first connecting part 1 faces away from the second connecting part 3 and forming an acute angle. In one embodiment, the acute angle is no less than 10°. Through testing, it is found that the value of the acute angle α has a very obvious influence on the mechanical stiffness of the damper. See FIG. 6, in the case that the other parameters remain the same, with the increasing of the acute angle α, the mechanical stiffness value Kms reduces, and the linear performance of the damper improves. The specific test data can be seen in Table 1 below:

TABLE 1

| Acute angle α | kms (N/mm) | Variation %@2 mm |
|---|---|---|
| 15° | 1.02 | 23.5% |
| 25° | 0.565 | 7% |
| 35° | 0.325 | 2% |

It can be seen from Table 1 that: when the acute angle α is 15°, the mechanical stiffness Kms of the damper is 1.02 N/mm, and the planar elastic part 2 of the damper exhibits a 23.5% variation of elastic force of when a 2 mm elastic deformation occurs; when the acute angle α is 25°, the mechanical stiffness Kms of the damper is 0.565 N/mm, and the planar elastic part 2 of the damper exhibits a 7% variation of elastic force of when a 2 mm elastic deformation occurs; when the acute angle α is 35°, the mechanical stiffness Kms of the damper is 0.325 N/mm, and the planar elastic part 2 of the damper exhibits a 2% variation of elastic force of when a 2 mm elastic deformation occurs;

An embodiment of the present disclosure also provides a sound-producing device, which includes a vibration system, a magnetic circuit system and a casing. The vibration system includes a combination of a diaphragm, a voice coil, a voice coil bobbin and the damper as described above. The magnetic circuit system has a magnetic gap in which the voice coil is suspended. The casing is configured to house the vibration system and the magnetic circuit system. The voice coil is wound on the voice coil bobbin, the diaphragm is connected to one end of the voice coil bobbin, the first connecting part 1 of the damper is connected to an outer side wall of the voice coil bobbin or to a root region of the voice coil, and the second connecting part 3 of the damper is fastened to the casing.

When there is provided one planar elastic part of the damper, there will be 4 dampers in total provided in the sound-producing device. That is, there are a total of 4 planar elastic parts 2 in the sound-producing device which are symmetrically distributed with respect to the center of the voice coil. In this embodiment, you may choose to install the dampers in the root region of the voice coil.

When there are provided two planar elastic part of the damper, there will be 2 dampers provided in the sound-producing device, i.e., to use two-piece type dampers each may include two planar elastic parts 2 and share the same first connecting part, wherein the two dampers are symmetrically distributed with respect to the center of the voice coil. In this embodiment, you may choose to install the dampers on the outer side wall of the voice coil bobbin. Of course, no matter which form the damper takes, it is theoretically feasible to either install it on the outer side wall of the voice coil bobbin or to install it in the root region of the voice coil.

In recent years, a development trend of a sound-producing device such as a speaker unit is to reduce its volume, improve its sensitivity and reduce its resonant frequency F0. In order to achieve a lower resonance frequency F0, the damper in the sound-producing device needs to provide a smaller mechanical stiffness Kms, or to provide a larger vibration mass Mms. However, sensitivity of the sound-producing device will decrease when the vibration mass is increased, and thus it is a relatively straightforward and feasible way to reduce the mechanical stiffness Kms of the damper. Nevertheless, as the traditional damper is limited by its structure and material, it is very difficult to make a damper with a relatively small mechanical stiffness Kms; what is more, fatigue resistance of the damper will also degrade, causing the damper to be prone to breakage and reducing its product life.

With the damper of the present disclosure, the mechanical stiffness Kms of the damper can be adjusted by adjusting shape of the damper, wire diameter of the metal wire and other parameters. It has been verified that the damper of the present disclosure can achieve better effects. See FIG. 7 and FIG. 8, the Kms of a damper of an embodiment verified by the present disclosure is 0.56 N/mm, while the Kms of a traditional damper is 0.82 N/mm. The symmetry of the damper Kms of the present disclosure is also obviously better than that of the traditional damper. With the damper of the present disclosure is installed, the resonant frequency F0 and the total harmonic distortion THD of the sound generating device are obviously reduced.

Figure 7:
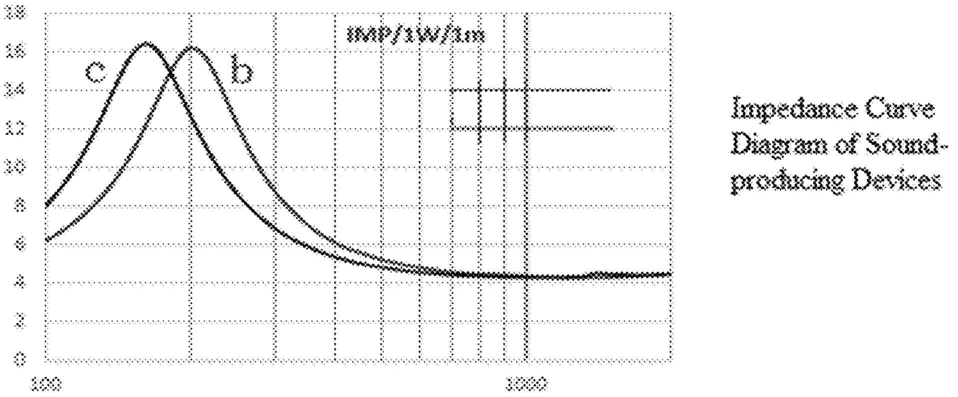
FIG. 7 is an impedance curve diagram of a sound-producing device installed with an existing damper and a sound-producing device installed with the damper of the present disclosure.

As shown in FIG. 7, a curve b shows an impedance curve corresponding to the damper in the prior art when installed in a sound-producing device; and the curve c shows an impedance curve corresponding to the damper of the embodiment of the present disclosure when installed in a sound-producing device. By comparing the curves, it can be seen that the peak of the F0 curve of the sound-producing device in curve b is around 195 Hz, while the peak of the F0 curve of the sound-producing device in curve c is around 170 Hz, that is to say, the resonant frequency F0 of the sound-producing device is lowered through use of the damper of the embodiment of the present disclosure.

Figure 8:
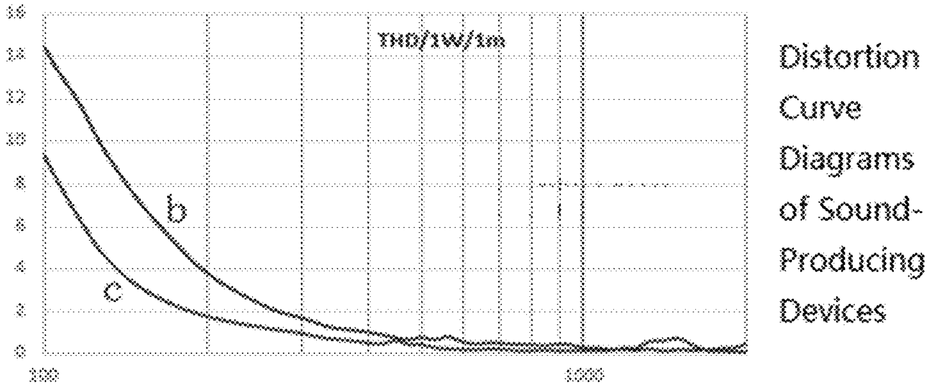
FIG. 8 is a distortion curve diagram of a sound-producing device installed with an existing damper and a sound-producing device installed with the damper of the present disclosure.

As shown in FIG. 8, curves b and c respectively show the distortion curves of the prior art damper and the damper of an embodiment of the present disclosure applied to the sound-producing device. The THD value of the damper of the embodiment of the present disclosure is lower than the THD value of the damper of the prior art, especially in the frequency range of 100-300 Hz. The damper of the present disclosure plays a major role in reducing THD: at 100 Hz frequency, the corresponding THD value in the prior art is less than 16% but greater than 14%, while the THD corresponding to the embodiment of the present disclosure is less than 10%; at 200 Hz frequency, the corresponding THD value in the prior art is less than 5%, i.e., about 4%, while the THD corresponding to the embodiment of the present disclosure is less than 2.5%, i.e., about 2%; at the frequency of 300 Hz, the corresponding THD value in the prior art is less than 2.5%, i.e., about 2%, while the THD corresponding to the embodiment of the present disclosure is less than 2%, i.e., about 1%. Therefore it can be seen that, the damper of the embodiment of the present disclosure significantly reduces either the F0 or the THD of the sound-producing device, thereby optimizing the acoustic performance of the sound-producing device.

Although the present disclosure has been described in detail in connection with some specific embodiments by way of illustration, those skilled in the art should understand that the above examples are provided for illustration only and should not be taken as a limitation on the scope of the disclosure. Those skilled in the art will appreciate that modifications may be made to the above embodiments without departing from the scope and spirit of the present disclosure. We therefore claim as our invention all that comes within the scope of the appended claims.

The invention claimed is:

1. A damper, comprising:
- a first connecting part having a first side configured to cooperatively connect to a voice coil of a sound-producing device;
- a first planar elastic part formed by first end of the first connecting part being bent and extending in an S shape toward a second side of the first connecting part, the first planar elastic part and the first connecting part provided in the same plane; and
- a second connecting part connected to a second end of the first planar elastic part distal to the first connecting part, and configured to be fixedly connected to the sound-producing device;
- wherein the damper is a line structure formed by integral winding,
- wherein the second end of the first planar elastic part is bent into a hook structure to form the second connecting part.

2. The damper of claim 1, wherein the first connecting part, the first planar elastic part and the second connecting part comprise metal material.

3. The damper of claim 2, wherein the metal material is any one of phosphor bronze, iron, steel or alloy material.

4. The damper of claim 1, further comprising a second planar elastic part formed by a second end of the first connecting part being bent and extending in an S shape.

5. The damper of claim 4, wherein the first connecting part is in the shape of an arc between the first and second planar elastic parts.

6. The damper of claim 4, wherein the first connecting part is in the shape of a broken line between the first and second planar elastic parts.

7. The damper of claim 1, wherein the second connecting part comprises one loop of the hook structure; or
- the second connecting part comprises at least two loops of the hook structure having overlapped orthographic projections in the vertical direction.

8. The damper of claim 1, wherein a width of the first planar elastic part gradually increases along a direction from the first connecting part to the second connecting part, with extension lines of two sides of the first planar elastic part in its width direction intersecting at a point in a direction in which the first connecting part faces away from the second connecting part and forming an acute angle.

9. The damper of claim 8, wherein the acute angle is no less than 10°.

10. A device, comprising:
- a vibration system, comprising a combination of a diaphragm, the voice coil, a voice coil bobbin and the damper of claim 1;
- a magnetic circuit system having a magnetic gap in which the voice coil is suspended; and
- a casing, configured to house the vibration system and the magnetic circuit system;
- wherein the voice coil is wound on the voice coil bobbin, the diaphragm is connected to one end of the voice coil bobbin, the first connecting part of the damper is connected to an outer side wall of the voice coil bobbin or to a root region of the voice coil, and the second connecting part of the damper is fastened to the casing.

* * * * *